UNITED STATES PATENT OFFICE.

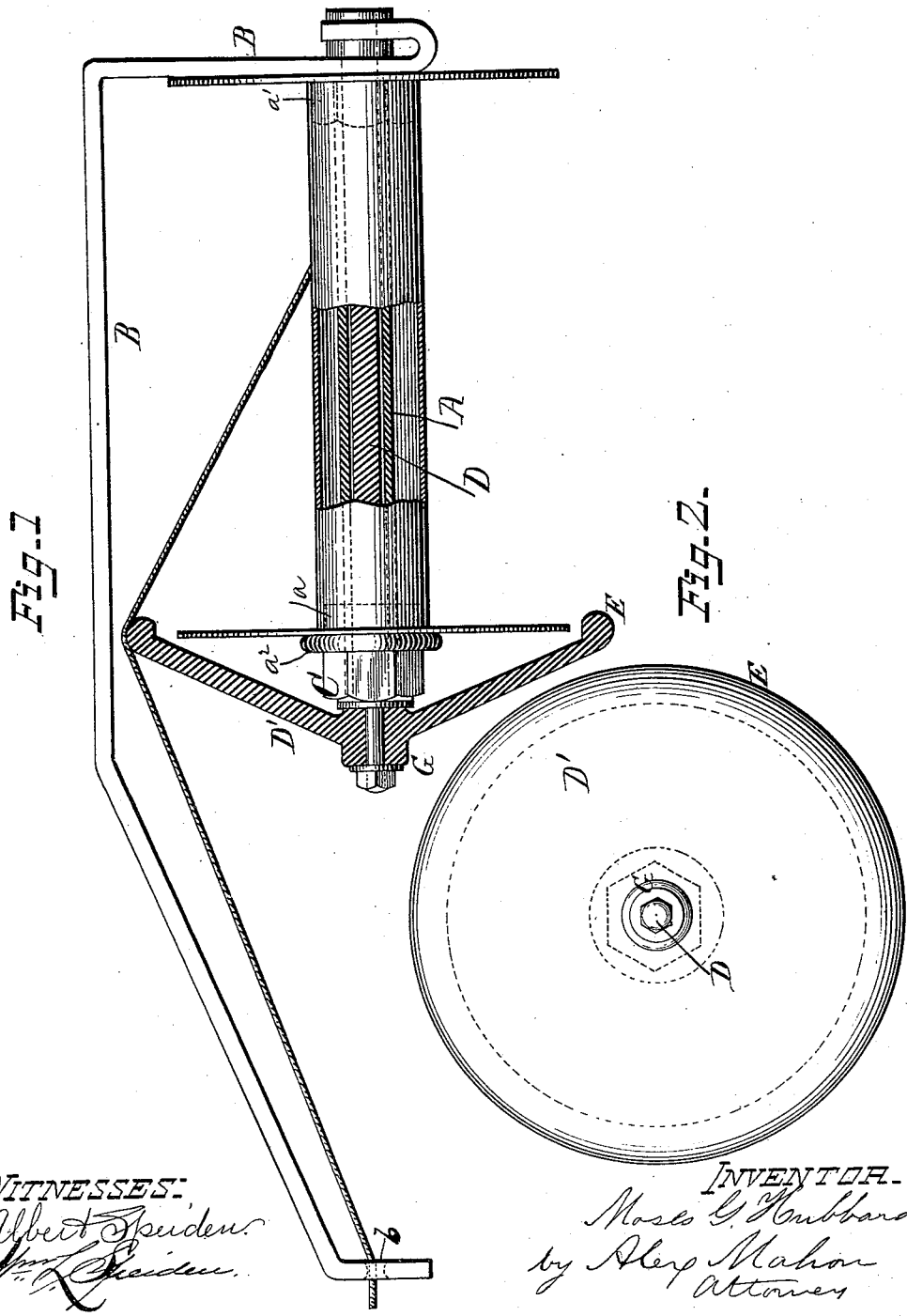

MOSES G. HUBBARD, OF PHILADELPHIA, PENNSYLVANIA.

AUTOMATIC UNWINDING ATTACHMENT.

SPECIFICATION forming part of Letters Patent No. 347,803, dated August 24, 1886.

Application filed January 28, 1886. Serial No. 190,061. (No model.)

*To all whom it may concern:*

Be it known that I, MOSES G. HUBBARD, of Philadelphia, county of Philadelphia, State of Pennsylvania, have invented certain new and useful Improvements in Automatic Unwinding Attachments, of which the following is a full and exact description, reference being had to the accompanying drawings, making part of this specification.

My invention relates to a device for unwinding wrapping or other twine from a spool or ball without revolving the same, to furnish twine for use by merchants and others to use hurriedly or intermittently, and which is adapted to avoid the tangling and other troubles which occur in using the ordinary balls of twine now in common use.

My invention consists in the combination of a fixed support, a large rounded revolving rim formed upon the periphery of a round plate for connecting it with a central hub, a revolving shaft or journal carrying the rim, and a central stationary guiding-eye, whereby the twine may be freely drawn from its spool or ball, all as hereinafter described.

In the accompanying drawings, Figure 1 is a plan view of the device, showing a portion in section. Fig. 2 is a top view of the rim, and showing its plate-connection with the hub.

A fixed support, A, for the ball or spool is shown, consisting of a hollow shaft having mounted at each end suitable hubs, $a$ $a'$, the forward one, $a$, being provided with a flange, $a^2$, between the inner face of which and an arm, B, hereinafter referred to, the support is clamped by a nut, C, or other suitable device at the forward or upper end of the same. The support is made hollow and the other parts perforated for the passage of a rod or shaft, D, having a suitable head at one end to engage the outer face of the arm D, said rod or shaft being of such length as to pass through the end of the arm, the fixed support, and the nut and washers, and project out a short distance beyond the nut C, and upon this projecting end is mounted the hub G of a large rounded rim, E, the hub and rim being shown connected together by means of a plate, D'.

By the employment of a large rounded rim, as herein described, attached to the central hub by an intervening plate, and the hub secured to the end of a revolving shaft mounted in the spool-support, which is firmly attached to the frame of the unwinder, leaves the large rounded rim free to revolve by the action of the twine in being pulled over it, and thus cause the twine to freely unwind from the spool, and which construction imparts a degree of rigidity which enables the device to resist the intermittent force and sudden jerks peculiar to the process of unwinding and using twine.

The arm B has one end preferably curved up in U form at the point at which the rod or shaft D passes through it, from which point it extends a short distance at right angles to the hollow shaft or support, where it is bent, and extends parallel with said support to near the end thereof, or slightly in advance of the spool-support, from which point it extends forward and inward some distance in advance of the spool-support, with its forward end about on a line with the axis of the support, at which point it is provided with a stationary eye or perforation, for the passage of the material.

The wound material, either in spool or ball form, is placed upon the fixed support, and the material passes therefrom over the rim and through the guiding-eye, and the end carried to the point at which it is desired to use the material. When the material is pulled, it will be drawn closely against the rounded rim, causing the same to revolve and unwind the material from the ball or spool in a manner that will be readily understood.

The device herein described is specially adapted to unwinding twine from a stationary spool or ball, and as the process of unwinding twine and the uses to which it is adapted are entirely distinct and different from those of thread, and the form and nature of the material being also so different, require such special construction and adaptation. Thread being so elastic as to spring off in coils from the spool, it may be successfully unwound by the ordinary well-known devices.

I am aware that a disk mounted upon the end of a spool or spool-spindle, over which the thread passed, and having a stationary guiding-eye arranged in line, or nearly so, with the axial center of the spool has before been used;

but said disk, so far as I am aware, was not adapted to revolve by the action of the material thereon.

I am also aware that a disk which was free to revolve by the action of the thread upon its edge has been used in connection with a guiding-eye arranged in a reciprocating needle-arm for unwinding thread in a sewing-machine, and such construction, also the construction shown in Patent No. 205,320, I do not claim.

I have shown in the drawings the rim with a rounded enlarged edge. This construction of rim is disclaimed in this case, as the novel features thereof constitute the subject of my case No. 209,326, filed July 28, 1886.

Having now described my invention, I claim—

1. In a device for unwinding twine, the combination of a fixed support, a revolving rim constructed substantially as described, attached to the end of a revolving shaft, the revolving shaft, and a stationary guiding-eye, arranged in line with the axis of the spool-shaft, substantially as and for the purpose set forth.

2. The combination of the hollow central support, a shaft carrying or supporting a freely-revolving rim mounted in the hollow support, the revolving rim, constructed substantially as described, and the stationary guiding-eye arranged in line with the axis of the spool-shaft, as and for the purpose set forth.

MOSES G. HUBBARD.

Witnesses:
CHARLES H. MINTZER,
HARRY W. LENTZ.